(12) United States Patent
Yang et al.

(10) Patent No.: US 12,266,153 B2
(45) Date of Patent: Apr. 1, 2025

(54) METHOD AND DEVICE FOR DETECTING OBJECT AND VEHICLE

(71) Applicant: XIAOMI EV TECHNOLOGY CO., LTD., Beijing (CN)

(72) Inventors: Yufan Yang, Beijing (CN); Xiong Zhao, Beijing (CN); Jun Zou, Beijing (CN)

(73) Assignee: XIAOMI EV TECHNOLOGY CO., LTD., Beijing (CN)

( * ) Notice: Subject to any disclaimer, the term of this patent is extended or adjusted under 35 U.S.C. 154(b) by 364 days.

(21) Appl. No.: 17/877,634

(22) Filed: Jul. 29, 2022

(65) Prior Publication Data
US 2023/0298317 A1    Sep. 21, 2023

(30) Foreign Application Priority Data

Mar. 16, 2022  (CN) .......................... 202210260712.1

(51) Int. Cl.
*G06V 20/56*    (2022.01)
*G06T 7/11*     (2017.01)
*G06V 10/25*    (2022.01)
*G06V 10/764*   (2022.01)

(52) U.S. Cl.
CPC .............. *G06V 10/764* (2022.01); *G06T 7/11* (2017.01); *G06V 10/25* (2022.01); *G06V 20/56* (2022.01); *G06V 2201/07* (2022.01)

(58) Field of Classification Search
CPC ...... G06V 10/764; G06V 10/25; G06V 20/56; G06V 2201/07; G06V 20/588; G06T 7/11; G06T 7/0002; G06T 7/70; G06T 2207/20104
See application file for complete search history.

(56) References Cited

U.S. PATENT DOCUMENTS

| | | | |
|---|---|---|---|
| 10,937,181 B2* | 3/2021 | Amano | H04N 13/204 |
| 10,997,740 B2* | 5/2021 | Biswas | G06T 7/536 |
| 2002/0036692 A1* | 3/2002 | Okada | H04N 23/682 |
| | | | 348/208.99 |
| 2006/0078165 A1* | 4/2006 | Watanabe | G06T 7/248 |
| | | | 382/107 |
| 2009/0041337 A1* | 2/2009 | Nakano | G06V 20/588 |
| | | | 348/E7.086 |
| 2016/0162741 A1* | 6/2016 | Shin | G06V 20/56 |
| | | | 382/104 |
| 2016/0232413 A1 | 8/2016 | Ito | |

(Continued)

OTHER PUBLICATIONS

European Patent Application No. 22187467.0, Search and Opinion dated May 17, 2023, 9 pages.

(Continued)

*Primary Examiner* — Aaron W Carter
(74) *Attorney, Agent, or Firm* — Cozen O'Connor

(57) ABSTRACT

A method for detecting an object includes obtaining an original image of a road through a sensor by performing an image capturing operation; extracting a region of interest (ROI) including a first target pixel point from the original image, in which the first target pixel point is a pixel point in the original image corresponding to a position on the road that is farthest from the sensor; and generating an object detection result by performing object detection on the ROI.

18 Claims, 4 Drawing Sheets

(56) References Cited

U.S. PATENT DOCUMENTS

| | | | |
|---|---|---|---|
| 2016/0379064 A1* | 12/2016 | van Beek | G06V 10/56 |
| | | | 382/104 |
| 2017/0091565 A1* | 3/2017 | Yokoi | G06V 10/25 |
| 2019/0042860 A1* | 2/2019 | Lee | G06V 20/588 |
| 2019/0266418 A1* | 8/2019 | Xu | G06V 10/457 |
| 2020/0082178 A1* | 3/2020 | Ahn | G06T 7/187 |
| 2020/0117920 A1* | 4/2020 | Lee | G06T 17/05 |
| 2021/0019897 A1* | 1/2021 | Biswas | G06T 7/11 |
| 2021/0326611 A1* | 10/2021 | Kim | G06T 7/11 |
| 2021/0400190 A1* | 12/2021 | Tanaka | B60R 1/28 |
| 2022/0277470 A1* | 9/2022 | Xiao | G06V 20/58 |
| 2022/0319147 A1* | 10/2022 | Yasui | G06V 20/588 |
| 2022/0374659 A1* | 11/2022 | Hu | H04N 13/161 |
| 2023/0014874 A1* | 1/2023 | Shen | G06V 20/56 |
| 2023/0258471 A1* | 8/2023 | Iqbal | G01C 21/3841 |
| | | | 701/532 |
| 2023/0298317 A1* | 9/2023 | Yang | G06V 20/588 |
| | | | 382/103 |
| 2023/0394843 A1* | 12/2023 | Lee | G06V 10/44 |

OTHER PUBLICATIONS

Suhr J.K. "Noise-resilient Road Surface and Free Space Estimation Using Dense Stereo" 2013 IEEE Intelligent Vehicles Symposium (IV) Jun. 201, pp. 461-466.

Kuan, D. et al. "A Realtime Road Following and Road Junction Detection Vision System for Autonomous Vehicles" Proceedings AAAI, Natl Conference on Artificial Intelligence, vol. 2, Aug. 1986, pp. 1127-1132.

* cited by examiner

METHOD AND DEVICE FOR DETECTING OBJECT AND VEHICLE

CROSS REFERENCE TO RELATED APPLICATION

The present application claims the benefit of priority to Chinese Patent Application No. 202210260712.1, filed on Mar. 16, 2022, the content of which is incorporated herein by reference in its entirety for all purposes.

TECHNICAL FIELD

The disclosure relates to a field of computer application technologies, and more particularly, to a vehicle, an electronic device, a storage medium, and a method and a device for detecting an object.

BACKGROUND

At present, object detection is widely used in daily life. For example, in autonomous driving scenarios, the object detection can be performed to avoid pedestrians, obstacles, and other vehicles. In robot-following scenarios, the object detection can be performed to follow the object.

SUMMARY

According to a first aspect of embodiments of the disclosure, there is provided a method for detecting an object. The method includes obtaining an original image of a road through a sensor by performing an image capturing operation; extracting a region of interest (ROI) including a first target pixel point from the original image, in which the first target pixel point a pixel point in the original image corresponding to a position on the road that is farthest from the sensor; and generating an object detection result by performing object detection on the ROI.

According to a second aspect of embodiments of the disclosure, there is provided a vehicle. The vehicle includes a processor; and a memory, for storing instructions executable by the processor. The processor is configured to implement a method for detecting an object according to the first aspect of embodiments by running the instructions.

According to a third aspect of embodiments of the disclosure, there is provided a non-transitory computer-readable storage medium, having instructions stored thereon. When instructions are executed by a processor of an electronic device, a method for detecting an object according to the first aspect of embodiments is performed.

It is to be understood that the foregoing general description and the following detailed description are examples used for explanations and are not restrictive of the disclosure.

BRIEF DESCRIPTION OF THE DRAWINGS

The accompanying drawings, which are incorporated in and constitute a part of this specification, illustrate embodiments consistent with the disclosure, serve to explain the principles of the disclosure together with the description, and do not unduly limit the disclosure.

DETAILED DESCRIPTION

In order to help those skilled in the art to well understand the technical solutions of the disclosure, the technical solutions of the disclosure will be clearly and completely described below with reference to the accompanying drawings.

It should be noted that the terms "first", "second" and the like in the description and claims of the disclosure and the above drawings are used to distinguish similar objects, and are not necessarily used to describe a specific order or sequence. It is to be understood that the data so used may be interchanged under appropriate circumstances such that the embodiments of the disclosure described herein can be practiced in sequences other than those illustrated or described herein. The implementations described in the illustrative examples below are not intended to represent all implementations consistent with this disclosure. Rather, they are merely examples of apparatus and methods consistent with some aspects of the disclosure as recited in the appended claims.

Figure 1:
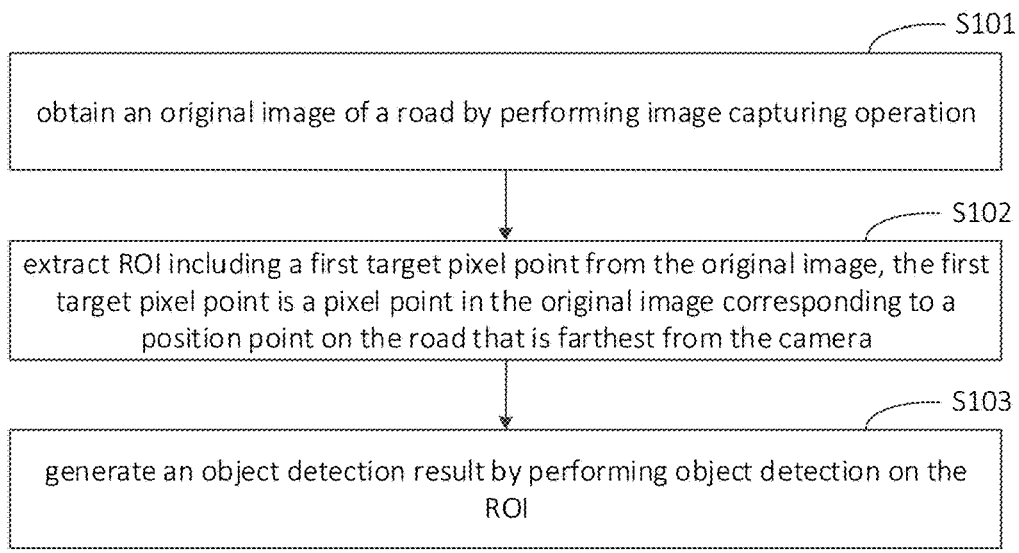
FIG. 1 is a flowchart illustrating a method for detecting an object in accordance with an embodiment of the disclosure.

An object detection method in the related art has problems such as low accuracy and low efficiency. Therefore, embodiments of the disclosure provide a method for detecting an object. FIG. 1 is a flowchart illustrating a method for detecting an object in accordance with an embodiment of the disclosure. As illustrated in FIG. 1, the method for detecting an object in accordance with an embodiment of the disclosure includes the following.

At block S101, an original image of a road is obtained through a sensor by performing image capturing operation.

The execution subject of the method for detecting an object in accordance with embodiments of the disclosure is an electronic device. The electronic device can be a mobile phone, a notebook, a desktop computer, a vehicle terminal, or a smart home appliance. For example, the method for detecting an object in accordance with embodiments of the disclosure can be performed by an apparatus for detecting an object in accordance with embodiments of the disclosure. The apparatus for detecting an object in accordance with embodiments of the disclosure may be integrated in any electronic device to execute the method for detecting an object in accordance with embodiments of the disclosure.

An image of the road can be captured as the original image. The manner of capturing the original image, the type of the original image, the type of the road, and the number of roads contained in the original image are not limited in the disclosure. For example, the execution subject can be an on-vehicle terminal, and the original image can be captured through sensors mounted on the vehicle or through other sensors that are not mounted on the vehicle. For example, the original image can be a red-green-blue (RGB) image, a depth map, point cloud data, or the like. For example, the road can be a road in front of the vehicle, and the type of the road can be, but not limited to, a lane on which the vehicle is traveling, a lane adjacent to the lane on which the vehicle is traveling, or an intersection in front of the vehicle. The lane can be a straight lane, a right-turning lane, a left-turning lane, or the like. For example, there can be one or more roads, and an image of the one or more roads are captured by performing the image capturing operation as the original image, i.e., there are one or more roads contained in the original image. For ease understanding, the case that there is one road is taken as an example. The case that there are multiple roads can refer to the case of one road, which will not be described here.

In the case that the execution subject is an on-vehicle terminal, the image capturing operation can be performed on the road in front of the vehicle by a sensor on the vehicle to obtain an original image of the road in front of the vehicle.

For example, a plane image of the road can be captured through a two-dimensional (2D) camera, and/or a stereoscopic image of the road of the road can be captured through a three-dimensional (3D) camera, and/or the point cloud data can be captured through a Lidar. The original image includes but is not limited to a plane image, a stereoscopic image, point cloud data, or the like.

The image capturing operation can be performed periodically to obtain original mages of the road. The period is not limited. For example, the period can be 2 seconds, 5 seconds, or the like.

At block S102, a region of interest (ROI) including a first target pixel point is extracted from the original image. The first target pixel point is a pixel point in the original image corresponding to a position on the road that is farthest from the sensor.

A pixel point corresponding to the position of the road that is farthest from the sensor can be determined in the original image as the first target pixel point, and the ROI including the first target pixel point may be extracted from the original image. It is understandable that each road may correspond to one first target pixel point, that is, the first target pixel point corresponds to the road one-to-one. It is to be noted that, one or more ROIs including the first target pixel point can be extracted for one road. Herein, there extracts one ROI including the first target pixel point for one road for ease understanding. When there are multiple first target pixel points, one ROI is extracted for each first target pixel point, such that each first target pixel point may correspond to one ROI. The shape of the ROI includes, but is not limited to, a square, a rectangle, a circle, an ellipse, or the like.

When the original image includes at least one road, a respective extracted ROI may include the first target pixel point of each road. As an example, the original image includes three roads, i.e., road 1, road 2, and road 3, and the road 1 corresponds to the first target pixel point A, the road 2 corresponds to the first target pixel point B, and the road 3 corresponds to the first target pixel point C. In this case, a ROI including the first target pixel point A, a ROI including the first target pixel point B, and a ROI including the first target pixel point C can be extracted from the original image.

Determining the first target pixel point from the original image may include obtaining depth information of a pixel point in the original image corresponding to each position point on the road, and determining a pixel point with maximum depth information as the first target pixel point. It is to be noted that the depth information of the pixel point refers to a distance between the sensor and a position point on the road corresponding to the pixel point. The manner of acquiring the depth information is not limited. For example, the depth information of a pixel point can be acquired through a 3D camera.

At block S103, an object detection result is generated by performing object detection on the ROI.

The type of the object detection and the type of the object detection result are not limited. For example, the object to be detected can be, but not limited to, a pedestrian, a vehicle, buildings, or the like, and the object detection can be correspondingly pedestrian detection, vehicle detection, image category detection, or the like.

For the pedestrian detection, the pedestrian detection result can be, but not limited to, the pedestrian position, the body width, the body height, the body posture, the pedestrian category, the number of pedestrians, the human face, or their combinations. The pedestrian position can be, but not limited to positions of pixel points corresponding to the pedestrian in the original image, the longitude and latitude of pedestrian, or their combinations. The body posture can be, but not limited to, walking, cycling, running, standing, etc. The pedestrian category can be, but not limited to, walkers, cyclists, children, pregnant women, old people, young people, etc.

For the vehicle detection, the vehicle detection result can be, but not limited to, the vehicle position, the vehicle width, the vehicle height, the vehicle posture, the vehicle type, the number of vehicles, the vehicle speed, or their combinations. The vehicle type can be, but not limited to, small vehicles, buses, and trucks, etc. The vehicle posture can be, but not limited to, going straight, turning, etc.

For the image category detection, the image category detection result can be, but not limited to, grassland, buildings, lakes, obstacles, roads, construction roads, etc.

In generating the object detection result by performing the object detection on the ROI, the ROI can be input into an object detection model, and the object detection model outputs the object detection result. It is to be noted that the object detection model is not limited. For example, the object detection model may include a feature pyramid network. The feature pyramid network extracts the multi-scale features of the object from the ROI, and fuses the multi-scale features of the object to generate the fusion feature of the object, to generate the object detection result based on the fusion feature of the object. The accuracy of the object detection is improved.

Figure 2:
FIG. 2 illustrates an original image used in a method for detecting an object in accordance with an embodiment of the disclosure.
Figure 3:
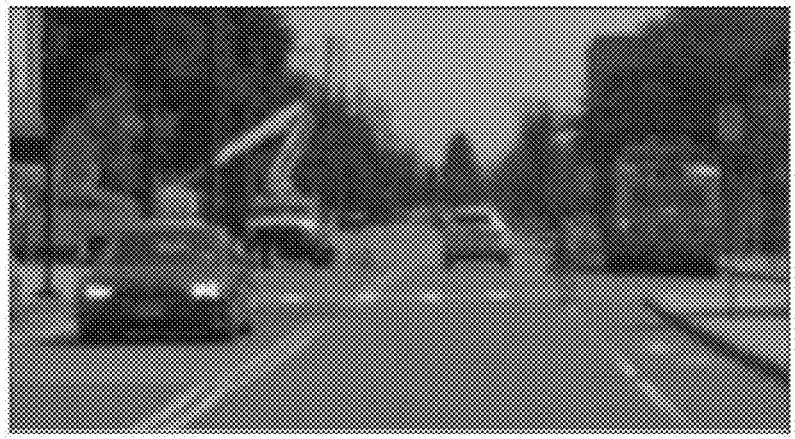
FIG. 3 illustrates a target image used in a method for detecting an object in accordance with an embodiment of the disclosure.

As an implementation, generating the object detection result by performing the object detection on the ROI includes generating a target image by cropping the original image based on the ROI, and generating the object detection result by performing the object detection on the target image. The target image refers to a part of the original image within the ROI. The target image corresponding to the ROI can be obtained by cutting the original image. For example, the original image is illustrated as FIG. 2 and the target image is illustrated as FIG. 3. It is to be noted that, descriptions of the object detection performed on the target image can see the foregoing embodiments, and details are not repeated here.

With the method for detecting an object in accordance with embodiments of the disclosure, the ROI including the first target pixel point is extracted from the original image of the road. The first target pixel point is a pixel point of the original image corresponding to a position on the road that is farthest from the sensor. The object detection result is generated by performing the object detection on the ROI. Therefore, the object detection can be performed on the ROI including the first target pixel point, rather than on the entire original image, which saves computing resources and improves the accuracy and efficiency of long-distance object detection.

Figure 4:
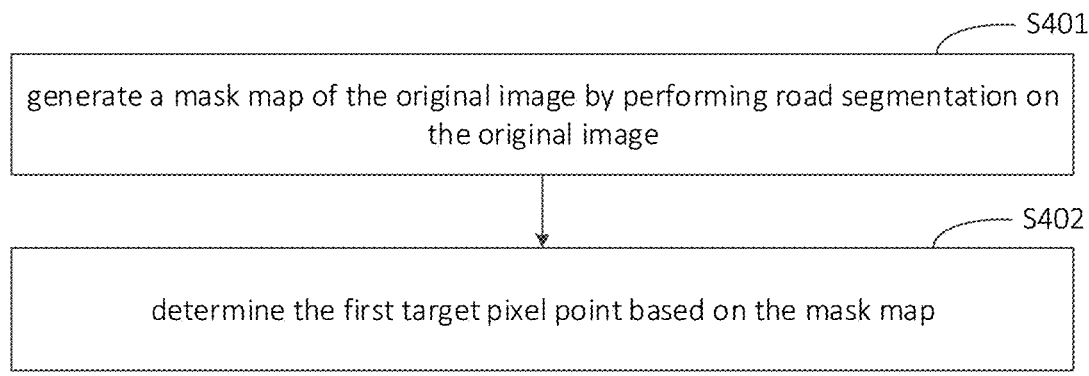
FIG. 4 is a flowchart of determining a first target pixel point from an original image in a method for detecting an object in accordance with an embodiment of the disclosure.

On the basis of any of the above embodiments, as illustrated in FIG. 4, determining the first target pixel point from the original image may include the following.

At block S401, a mask map of the original image is generated by performing road segmentation on the original image.

Figure 5:
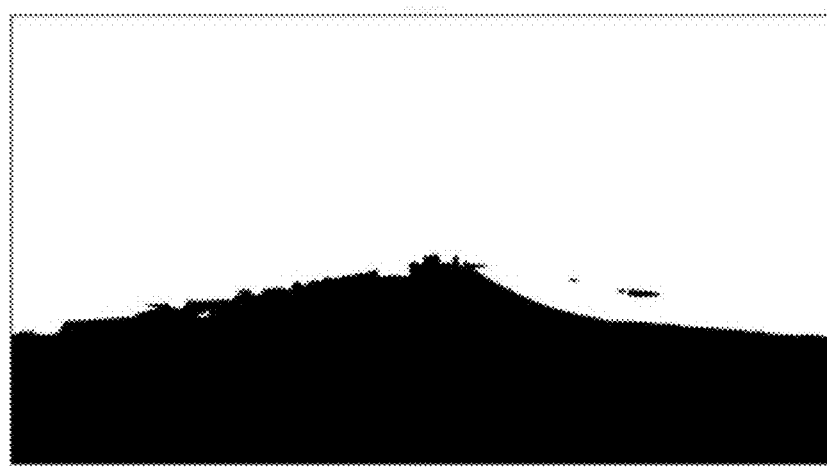
FIG. 5 illustrates a mask map generated by a method for detecting an object in accordance with an embodiment of the disclosure.

As an implementation, generating the mask map by performing the road segmentation includes: identifying categories of the pixel points in the original image, setting color of road pixel points to black, and setting color of non-road pixel points to white to generate the mask map. The road pixel point refers to that its category is a road category. The non-road pixel points refers to that its category is not a road category. For the original image illustrated as FIG. 2 the generated mask map is illustrated as FIG. 5.

As another implementation, generating the mask map by performing the road segmentation includes inputting the original image into a road segmentation model, and outputting the mask map by the road segmentation model. The road segmentation model is not limited herein.

At block S402, the first target pixel point is determined based on the mask map.

As an implementation, determining the first target pixel point based on the mask map may include: traversing the mask map from a first row of the mask map until a pixel point with the black color is found, and in response to finding the pixel point with the black color, determining the pixel point as the first target pixel point.

Since the mask map carries the category of each pixel point, determining the first target pixel point based on the mask map may include determining, from the mask map, candidate pixel points whose category is the road category, and selecting the first target pixel point from the candidate pixel points. For example, the depth information of the candidate pixel points may be acquired, and a candidate pixel point corresponding to the maximum depth information may be determined as the first target pixel point.

In this way, the road segmentation can be performed on the original image to generate the mask map of the original image, and the first target pixel point can be determined based on the mask map. Applying the road segmentation to the object detection scene, the detection of the first target pixel point is realized.

Based on any of the above embodiments, the ROI further includes one or more second target pixel points. The second target pixel point refers to a pixel point of the original image corresponding to a position point on the road that exceeds a preset distance away from the sensor. That is, if the distance between a position point on the road and the sensor is equal to or greater than the preset distance, the position point is determined as a second target pixel point. The value of the preset distance is not limited. It is understandable that the second target pixel point refers to the pixel point in the original image corresponding to a position of the road that is relatively far away from the sensor. The number of the second target pixel points is not limited.

As an implementation, determining the second target pixel point from the original image may include acquiring depth information of pixel points in the original image corresponding to the position points of the road, and determining a pixel point whose depth information is greater than or equal to a preset threshold as the second target pixel point. It is to be noted that, details of acquiring the depth information can see the descriptions of foregoing embodiments, which are not repeated here.

Figure 6:
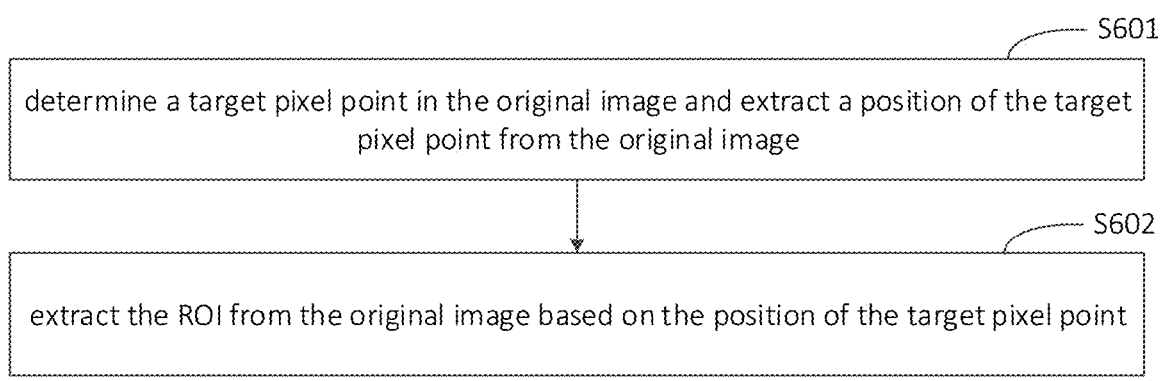
FIG. 6 is a flowchart of extracting a region of interest from an original image in a method for detecting an object in accordance with an embodiment of the disclosure.

On the basis of any of the above-mentioned embodiments, as illustrated in FIG. 6, extracting the ROI including a target pixel point from the original image includes the following. In FIG. 6, the first target pixel point and the second pixel point are collectively referred as "target pixel point".

At block S601, the target pixel point is determined from the original image, and a position of the target pixel point is extracted from the original image.

In the block S601, when the target pixel point refers to the first target pixel point, the position of each first target pixel point is obtained. When the target pixel point refers to the second target pixel point, the position of each second target pixel point is obtained. When the target pixel point refers to the first target pixel point and the second target pixel point, the position of each first target pixel point and the position of each second target pixel point are obtained. Details of determining the first target pixel point and/or the second target pixel point from the original image can see the descriptions of the foregoing embodiments, which are not repeated here.

It is to be noted that the type of the position of the target pixel is not limited. For example, the position of the target pixel refers to pixel coordinate in the original image, or latitude and longitude. The pixel coordinate can be, but not limited to, 2D coordinates of the target pixel in the original image, the row number of the target pixel and the column number of the target pixel.

The original image carries the position of each pixel point such that the position of the target pixel point can be extracted from the original image.

At block S602, the ROI is extracted from the original image based on the position of the target pixel point.

As an implementation, extracting the ROI from the original image based on the positions of the target pixel points may include obtaining, from the original image, a region that is centered on the positions of the target pixel points and extending outward based on a preset value, as the ROI. Extending outward based on the preset value refers to enlarging the area of the region by taking the positions of the target pixel points as center. When the target pixel point refers to multiple second target pixel points, a center of the multiple second target pixel points can be determined and the ROI can be determined by taking the center as a center and extending outward based on the preset value. When the target pixel point refers to the first target pixel point and one or more second target pixel points, a center of the first target pixel point and the one or more second target pixel points can be determined, and the ROI can be determined by taking the center as a center and extending outward based on the preset value.

As an implementation, extracting the ROI from the original image based on the positions of the target pixels may include obtaining, from the original image, a rectangular region that takes the positions of the target pixel points as the center, as the ROI.

Therefore, the target pixel points can be determined from the original image, the positions of the target pixel points can be extracted from the original image, and the ROI can be extracted from the original image based on the positions of the target pixels.

Figure 7:
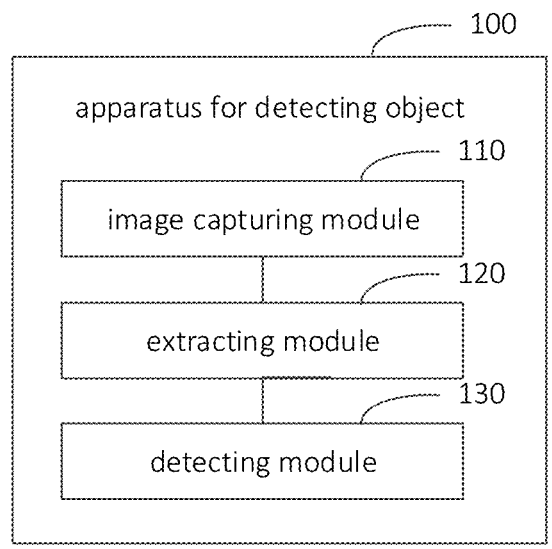
FIG. 7 is a block diagram illustrating an apparatus for detecting an object in accordance with an embodiment of the disclosure.

FIG. 7 is a block diagram illustrating an apparatus for detecting an object in accordance with an embodiment of the disclosure. As illustrated in FIG. 7, the apparatus 100 for detecting an object includes an image capturing module 110, an extracting module 120, and a detecting module 130.

The image capturing module 110 is configured to obtain an original image of a road through a sensor by performing image capturing operation.

The extracting module 120 is configured to extract a ROI including a first target pixel point from the original image. The first target pixel point is a pixel point in the original image corresponding to a position on the road that is farthest from the sensor.

The detecting module 130 is configured to generate an object detection result by performing object detection on the ROI.

In some examples, the apparatus 100 for detecting an object further includes a generating module and a first determining module. The generating module is configured to generate a mask map of the original image by performing road segmentation on the original image. The first determining module is configured to determine the first target pixel point based on the mask map.

In some examples, the generating module is further configured to input the original image into a road segmentation model, and the mask map is output by the road segmentation model.

In some examples, the first determining module is further configured to traverse the mask map from a first row of the mask map until a pixel point with the black color is found, and in response to finding the pixel point with the black color, determine the pixel point as the first target pixel point.

In some examples, the ROI further includes one or more second target pixel points. The second target pixel point refers to a pixel point of the original image corresponding to a position point on the road that exceeds a preset distance away from the sensor.

In some examples, the apparatus 100 for detecting an object further includes an obtaining module and a second determining module. The obtaining module is configured to obtain depth information of pixel points in the original image corresponding to the position points on the road. The second determining module is configured to determine a pixel whose depth information is greater than or equal to a preset threshold as the second target pixel point.

In some examples, the extracting module 120 is further configured to determine a target pixel point from the original image, and extract the position of the target pixel point from the original image. The target pixel point refers to the first target pixel point and/or the second target pixel point. The extracting module 120 is further configured to extract the ROI from the original image based on the position of the target pixel point.

In some examples, the detecting module 130 is further configured to generate a target image by cropping the original image based on the ROI; and generate the object detection result by performing the object detection on the target image.

Regarding the apparatus in the above-mentioned embodiment, the specific manner in which each module performs the operation has been described in detail in the embodiment of the method, and will not be described in detail here.

With the apparatus of detecting an object in accordance with embodiments of the disclosure, the ROI including the first target pixel point is extracted from the original image of the road. The first target pixel point is a pixel point of the original image corresponding to a position on the road that is farthest from the sensor. The object detection result is generated by performing the object detection on the ROI. Therefore, the object detection can be performed on the ROI including the first target pixel point, rather than on the entire original image, which saves computing resources and improves the accuracy and efficiency of long-distance object detection.

Figure 8:
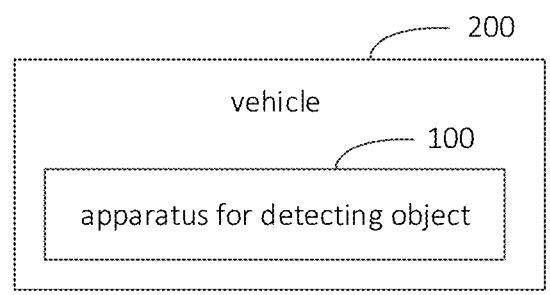
FIG. 8 is a block diagram illustrating a vehicle in accordance with an embodiment of the disclosure.

In order to realize the above-mentioned embodiments, as illustrated in FIG. 8, a vehicle 200 is provided in the disclosure. The vehicle 200 includes the apparatus 100 for detecting an object.

With the vehicle in accordance with embodiments of the disclosure, the ROI including the first target pixel point is extracted from the original image of the road. The first target pixel point is a pixel point of the original image corresponding to a position on the road that is farthest from the sensor. The object detection result is generated by performing the object detection on the ROI. Therefore, the object detection can be performed on the ROI including the first target pixel point, rather than on the entire original image, which saves computing resources and improves the accuracy and efficiency of long-distance object detection.

Figure 9:
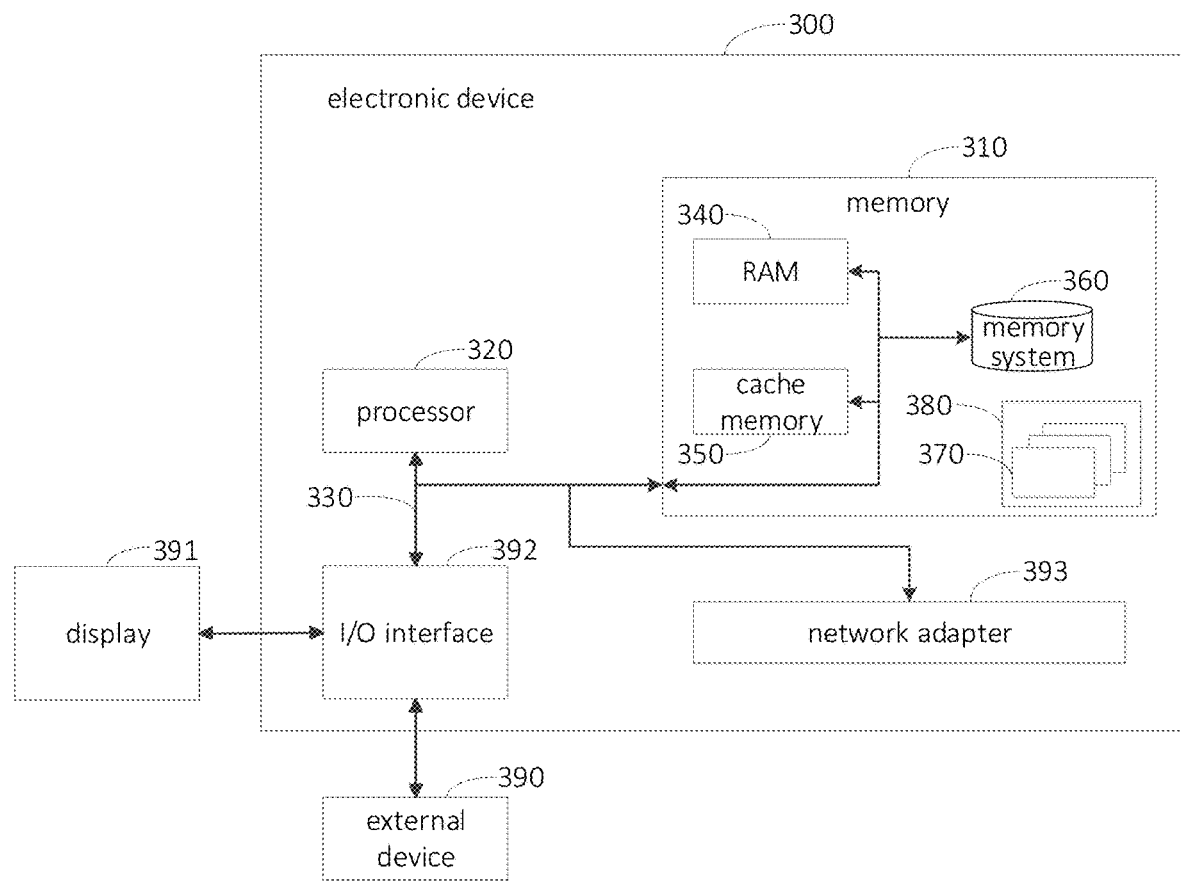
FIG. 9 is a block diagram illustrating an electronic device in accordance with an embodiment of the disclosure.

FIG. 9 is a block diagram illustrating an electronic device 300 in accordance with embodiments of the disclosure.

As illustrated in FIG. 9, the above-mentioned electronic device 300 includes a memory 310, a processor 320, and a bus 330 connecting different components (including the memory 310 and the processor 320). The memory 310 stores a computer program. When the processor 320 executes the program, the method for detecting an object in accordance with embodiments of the disclosure is performed.

The bus 330 represents one or more of several types of bus structures, including a memory bus, a memory controller, a peripheral bus, a graphics acceleration port, a processor, or a local bus using any of a variety of bus structures. By way of example, these architectures include, but are not limited to, Industry Standard Architecture (ISA) bus, Micro Channel Architecture (MAC) bus, Enhanced ISA bus, Video Electronics Standards Association (VESA) local bus, and Peripheral Component Interconnect (PCI) bus.

The electronic device 300 typically includes a variety of electronic device-readable media. These media can be any available media that can be accessed by electronic device 300, including volatile and non-volatile media, removable and non-removable media.

The memory 310 may also include computer system readable media in the form of volatile memory, such as random access memory (RAM) 340 and/or cache memory 350. The electronic device 300 may further include other removable/non-removable, volatile/non-volatile computer system storage media. For example, a memory system 360 may be used to read and write to non-removable, non-volatile magnetic media (not illustrated in FIG. 9, commonly referred to as a "hard drive"). Although not illustrated in FIG. 9, a magnetic disk drive for reading and writing to removable non-volatile magnetic disks (e.g., "floppy disks") and an optical disk drive for reading and writing to removable non-volatile optical disks (e.g. CD-ROM, DVD-ROM or other optical media) may be provided. In these cases, each drive may be connected to the bus 330 through one or more data media interfaces. The memory 310 may include at least one program product having a set of (e.g., at least one) program modules configured to perform the functions of various embodiments of the disclosure.

A program/utility 380 having a set (at least one) of program modules 370 may be stored, for example, in the memory 310. These program modules 370 include, but not limited to, an operating system, one or more application programs, other programs modules and program data. Each or some combination of these examples may include the implementation of a network environment. The program modules 370 generally perform the functions and/or methods in accordance with embodiments of the disclosure.

The electronic device 300 may also communicate with one or more external devices 390 (e.g., keyboard, pointing device, display 391 or the like), with one or more devices that enable a user to interact with the electronic device 300, and/or with any device (e.g., network card, modem, or the like) that enables the electronic device 300 to communicate with one or more other computing devices. Such communication may occur through input/output (I/O) interface 392. Also, the electronic device 300 may communicate with one or more networks (e.g., a local area network (LAN), a wide area network (WAN), and/or a public network such as the Internet) through a network adapter 393. As illustrated in FIG. 9, the network adapter 393 communicates with other modules of the electronic device 300 through the bus 330. It is understandable that, although not shown, other hardware and/or software modules may be used in conjunction with electronic device 300, including but not limited to: microcode, device drivers, redundant processing units, external disk drive arrays, RAID systems, tape drives and data backup storage systems.

The processor 320 executes various functions and data processing by executing programs stored in the memory 310.

It is to be noted that, for the implementation process and technical principle of the electronic device in this embodiment, reference may be made to the foregoing explanation of the object detection method in accordance with embodiments of the disclosure, and details are not repeated here.

With the electronic device in accordance with embodiments of the disclosure, the ROI including the first target pixel point is extracted from the original image of the road. The first target pixel point is a pixel point of the original image corresponding to a position on the road that is farthest from the sensor. The object detection result is generated by performing the object detection on the ROI. Therefore, the object detection can be performed on the ROI including the first target pixel point, rather than on the entire original image, which saves computing resources and improves the accuracy and efficiency of long-distance object detection.

In order to implement the above embodiments, the disclosure also provides a computer-readable storage medium.

When instructions in the computer-readable storage medium are executed by the processor of the electronic device, the electronic device can execute the aforementioned method for detecting an object. Alternatively, the computer-readable storage medium may be ROM, random access memory (RAM), CD-ROM, magnetic tape, floppy disk, optical data storage device, and the like.

In order to implement the above embodiments, the disclosure also provides a computer program product, including a computer program. When the computer program is executed by a processor of an electronic device, the aforementioned method for detecting an object is performed.

Other embodiments of the disclosure will readily occur to those skilled in the art upon consideration of the specification and practice of the disclosure disclosed herein. This disclosure is intended to cover any variations, uses, or adaptations of this disclosure that follow the general principles of this disclosure and include common general knowledge or techniques in the technical field not disclosed by this disclosure. The specification and examples are to be regarded as examples only, with the true scope and spirit of the disclosure being indicated by the following claims.

It is to be understood that the disclosure is not limited to the precise structures described above and illustrated in the accompanying drawings, and that various modifications and changes may be made without departing from the scope thereof. The scope of the disclosure is limited only by the appended claims.

What is claimed is:

1. A method for detecting an object, comprising:
   obtaining an original image of a road through a sensor by performing an image capturing operation;
   extracting a region of interest (ROI) including a target pixel point from the original image, wherein the target pixel point comprises a first target pixel point and a second target pixel point, the first target pixel point is a pixel point in the original image corresponding to a position on the road that is farthest from the sensor, and the second target pixel point refers to a pixel point of the original image corresponding to a position point on the road that exceeds a preset distance away from the sensor; and
   generating an object detection result by performing object detection on the ROI.

2. The method of claim 1, further comprising:
   generating a mask map of the original image by performing road segmentation on the original image; and
   determining the first target pixel point based on the mask map.

3. The method of claim 2, wherein generating the mask map comprises:
   inputting the original image to a road segmentation model, and obtaining the mask map outputted by the road segmentation model.

4. The method of claim 2, wherein determining the first target pixel point comprises:
   traversing the mask map from a first row of the mask map until a pixel point with black color is found, and in response to finding the pixel point with the black color, determining the pixel point as the first target pixel point.

5. The method of claim 1, further comprising:
   obtaining depth information of pixel points of the original image corresponding to position points of the road; and
   determining a pixel point whose depth information is equal to or greater than a preset threshold as the second target pixel point.

6. The method of claim 1, wherein extracting the ROI comprises:
   determining the target pixel point in the original image, and extracting a position of the target pixel point from the original image; and
   extracting the ROI from the original image based on the position of the target pixel point.

7. The method of claim 1, wherein generating the object detection result comprises:
   generating a target image by cropping the original image based on the ROI; and
   generating the object detection result by performing the object detection on the target image.

8. A vehicle, comprising:
   a processor; and
   a memory, for storing machine-readable instructions that, when executed by the processor cause the processor to:
   obtain an original image of a road through a sensor by performing an image capturing operation;

extract a region of interest (ROI) including a target pixel point from the original image, wherein the target pixel point comprises a first target pixel point and a second target pixel point, the first target pixel point a pixel point in the original image corresponding to a position on the road that is farthest from the sensor, and the second target pixel point refers to a pixel point of the original image corresponding to a position point on the road that exceeds a preset distance away from the sensor; and generate an object detection result by performing object detection on the ROI.

9. The vehicle of claim 8, the memory further comprising machine-readable instructions that, when executed by the processor, cause the processor to:

generate a mask map of the original image by performing road segmentation on the original image; and determine the first target pixel point based on the mask map.

10. The vehicle of claim 9, the memory further comprising machine-readable instructions that, when executed by the processor, cause the processor to:

input the original image to a road segmentation model, and obtain the mask map outputted by the road segmentation model.

11. The vehicle of claim 9, the memory further comprising machine-readable instructions that, when executed by the processor, cause the processor to:

traverse the mask map from a first row of the mask map until a pixel point with black color is found, and in response to finding the pixel point with the black color, determining the pixel point as the first target pixel point.

12. The vehicle of claim 8, the memory further comprising machine-readable instructions that, when executed by the processor, cause the processor to:

obtain depth information of pixel points of the original image corresponding to position points of the road; and determine a pixel point whose depth information is equal to or greater than a preset threshold as the second target pixel point.

13. The vehicle of claim 8, the memory further comprising machine-readable instructions that, when executed by the processor, cause the processor to:

determine the target pixel point in the original image, and extract a position of the target pixel point from the original image; and extract the ROI from the original image based on the position of the target pixel point.

14. The vehicle of claim 8, the memory further comprising machine-readable instructions that, when executed by the processor, cause the processor to:

generate a target image by cropping the original image based on the ROI; and generate the object detection result by performing the object detection on the target image.

15. A non-transitory computer-readable storage medium, having machine-readable instructions stored thereon that, when executed by a processor of an electronic device, cause the processor to:

obtain an original image of a road through a sensor by performing an image capturing operation;

extract a region of interest (ROI) including a target pixel point from the original image, wherein the target pixel point comprises a first target pixel point and a second target pixel point, the first target pixel point a pixel point in the original image corresponding to a position on the road that is farthest from the sensor, and the second target pixel point refers to a pixel point of the original image corresponding to a position point on the road that exceeds a preset distance away from the sensor; and generate an object detection result by performing object detection on the ROI.

16. The non-transitory computer-readable storage medium of claim 15, further comprising machine-readable instructions that, when executed by the processor, cause the processor to:

generating a mask map of the original image by performing road segmentation on the original image; and determining the first target pixel point based on the mask map.

17. The non-transitory computer-readable storage medium of claim 16, further comprising machine-readable instructions that, when executed by the processor, cause the processor to, when generating the mask map:

input the original image to a road segmentation model, and obtaining the mask map outputted by the road segmentation model.

18. The non-transitory computer-readable storage medium of claim 16, further comprising machine-readable instructions that, when executed by the processor, cause the processor to, when determining the first target pixel point:

traverse the mask map from a first row of the mask map until a pixel point with black color is found; and, in response to finding the pixel point with the black color, determine the pixel point as the first target pixel point.

* * * * *